US011530112B2

(12) United States Patent
Wurth et al.

(10) Patent No.: US 11,530,112 B2
(45) Date of Patent: Dec. 20, 2022

(54) WIRE ROPE CLAMP ASSEMBLY

(71) Applicant: Wurtec, Incorporated, Toledo, OH (US)

(72) Inventors: Steven P. Wurth, Sylvania, OH (US); Terry Rodebaugh, Whitehouse, OH (US)

(73) Assignee: WURTEC, INCORPORATED, Toledo, OH (US)

( * ) Notice: Subject to any disclaimer, the term of this patent is extended or adjusted under 35 U.S.C. 154(b) by 910 days.

(21) Appl. No.: 16/392,758

(22) Filed: Apr. 24, 2019

(65) Prior Publication Data
US 2020/0339386 A1    Oct. 29, 2020

(51) Int. Cl.
*B66B 5/00* (2006.01)
*B66B 5/18* (2006.01)
*F16G 11/04* (2006.01)
*F16G 11/06* (2006.01)

(52) U.S. Cl.
CPC ............ *B66B 5/0075* (2013.01); *B66B 5/185* (2013.01); *F16G 11/04* (2013.01); *F16G 11/06* (2013.01)

(58) Field of Classification Search
CPC ........ F16G 11/04; F16B 7/0433; F16L 3/227; F16L 3/2235; Y10T 24/3958; Y10T 403/7141
See application file for complete search history.

(56) References Cited

U.S. PATENT DOCUMENTS

| 899,757 | A | * | 9/1908 | Newhall | F16B 7/182 403/312 |
| 928,367 | A | * | 7/1909 | De Witt | F16G 11/10 24/135 R |
| 1,696,889 | A | | 12/1928 | Scott | |
| 1,909,344 | A | | 5/1933 | Green et al. | |
| 2,025,556 | A | * | 12/1935 | Stahl | F16G 11/048 29/517 |
| 3,519,101 | A | | 7/1970 | Sieffert | |
| 3,879,147 | A | * | 4/1975 | Morell | F16G 11/048 403/374.2 |

(Continued)

OTHER PUBLICATIONS

De Witt, "Wire Rope Clamp", U.S. Pat. No. 928,367, Issued Jul. 20, 1909.

*Primary Examiner* — Robert Sandy
(74) *Attorney, Agent, or Firm* — C. Fred Charpie, III; Ward Law Office LLC

(57) ABSTRACT

A wire rope clamp assembly for use with an elevator is provided. The wire rope clamp includes a first clamp member having an outer side and an inner side. The inner side has a plurality of channels configured to receive one or more suspension members. The plurality of first clamp member channels has a plurality of surface structures configured to engage lays of the one or more suspension members. A second clamp member is configured for attachment to the first clamp member. The second clamp member has an outer side and an inner side. The inner side has a plurality of channels configured to receive the one or more suspension members. The plurality of second clamp member channels has a plurality of surface structures configured to engage lays of the one or more suspension members. The plurality of surface structures for the first and second clamp member channels are multidirectional.

12 Claims, 9 Drawing Sheets

(56) References Cited

U.S. PATENT DOCUMENTS

| | | |
|---|---|---|
| 4,269,380 A | 5/1981 | Shima et al. |
| 4,493,134 A | 1/1985 | Karr |
| 5,794,897 A * | 8/1998 | Jobin .................. H02G 7/053 248/68.1 |
| 6,327,753 B1 | 12/2001 | Rushing |
| 6,842,949 B2 | 1/2005 | Warren |
| 9,562,321 B2 * | 2/2017 | Manabe ................ D07B 1/005 |
| 9,902,595 B2 | 2/2018 | Lampinen et al. |

* cited by examiner

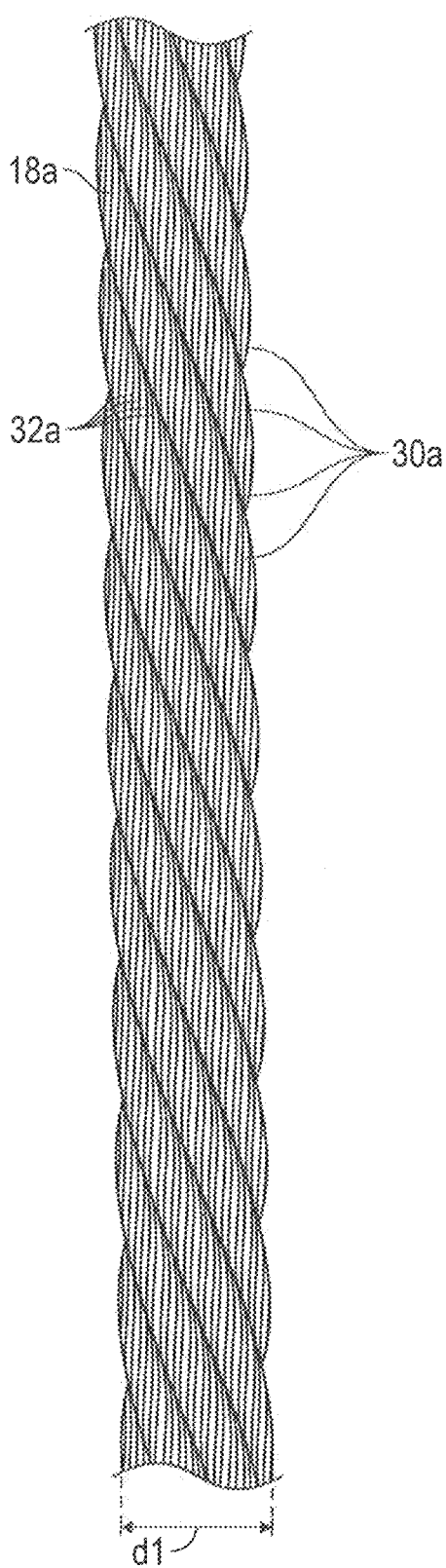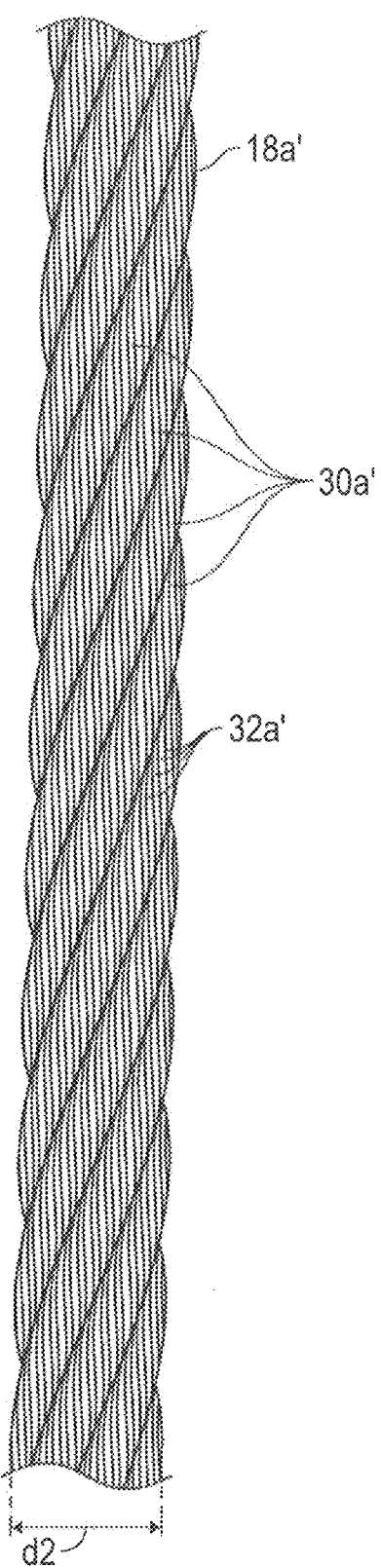
FIG. 2A
(Prior Art)
FIG. 2B
(Prior Art)

WIRE ROPE CLAMP ASSEMBLY

BACKGROUND

An elevator is a type of vertical transportation equipment that efficiently moves people and/or goods between floors, levels and/or decks of a building, vessel or other structure. One type of elevator is called a traction elevator. Traction elevators use geared or gearless traction machines to drive suspension elements connected on one end to an elevator car and connected on the opposite end to a counterweight. In certain instances, the suspension elements are wire ropes The elevator car and the counterweight are located within a portion of the building referred to as a hoistway. The geared or gearless machines are driven by electric motors.

Typically, the elevator car moves in a vertical direction within opposing car guide rails and the counterweight move in an opposing vertical direction within opposing counterweight guide rails. Often, the placement of the car and counterweight guide rails are such that the elevator car and the counterweight can be in close proximity to each other.

In certain instances, routine operations on a traction elevator can involve tasks such as the non-limiting example of shortening the length of the wire ropes. In these instances, it can be desirable to suspend the elevator car while the wire ropes are attended to.

It would be advantageous if wire rope clamps could be improved.

SUMMARY

It should be appreciated that this Summary is provided to introduce a selection of concepts in a simplified form, the concepts being further described below in the Detailed Description. This Summary is not intended to identify key features or essential features of this disclosure, not is it intended to limit the scope of the wire rope clamp assembly.

The above objects as well as other objects not specifically enumerated are achieved by a wire rope clamp assembly for use with an elevator. The wire rope clamp includes a first clamp member having an outer side and an inner side. The inner side has a plurality of channels configured to receive one or more suspension members. The plurality of first clamp member channels has a plurality of surface structures configured to engage lays of the one or more suspension members. A second clamp member is configured for attachment to the first clamp member. The second clamp member has an outer side and an inner side. The inner side has a plurality of channels configured to receive the one or more suspension members. The plurality of second clamp member channels has a plurality of surface structures configured to engage lays of the one or more suspension members. The plurality of surface structures for the first and second clamp member channels are multidirectional.

The above objects as well as other objects not specifically enumerated are also achieved by a wire rope clamp assembly for use with an elevator. The wire rope clamp assembly includes a first clamp member having a plurality of channels configured to receive one or more suspension members. The plurality of first clamp member channels have a plurality of surface structures configured to engage lays of the one or more suspension members. A second clamp member is configured for attachment to the first clamp member. The second clamp member has a plurality of channels configured to receive the one or more suspension members. The plurality of second clamp member channels has a plurality of surface structures configured to engage lays of the one or more suspension members. The plurality of surface structures for the first and second clamp member channels are aligned with a twist of a plurality of lays forming the one or more suspension members.

The above objects as well as other objects not specifically enumerated are also achieved by a wire rope clamp assembly for use with an elevator. The wire rope clamp assembly including a first clamp member having a plurality of channels configured to receive one or more suspension members. The plurality of first clamp member channels having a plurality of surface structures configured to engage lays of the one or more suspension members. A second clamp member is configured for attachment to the first clamp member with a plurality of fastening elements. The second clamp member has a plurality of channels configured to receive the one or more suspension members. The plurality of second clamp member channels have a plurality of surface structures configured to engage lays of the one or more suspension members. The plurality of fastening elements are positioned on both sides of each of the one or more suspension members.

Various objects and advantages of the wire rope clamp assembly will become apparent to those skilled in the art from the following detailed description, when read in light of the accompanying drawings.

BRIEF DESCRIPTION OF THE DRAWINGS

FIG. 2A is a perspective view of a portion of a suspension element of the conventional elevator of FIG. 1, illustrating "left-hand" lays.

FIG. 2B is a perspective view of a portion of a suspension element of the conventional elevator of FIG. 1, illustrating "right-hand" lays.

DETAILED DESCRIPTION OF THE INVENTION

The wire rope clamp assembly will now be described with occasional reference to specific embodiments. The wire rope clamp assembly may, however, be embodied in different forms and should not be construed as limited to the embodiments set forth herein. Rather, these embodiments are provided so that this disclosure will be thorough and complete, and will fully convey the scope of the wire rope clamp assembly to those skilled in the art.

Unless otherwise defined, all technical and scientific terms used herein have the same meaning as commonly understood by one of ordinary skill in the art to which the wire rope clamp assembly belongs. The terminology used in the description of the wire rope clamp assembly herein is for describing particular embodiments only and is not intended to be limiting. As used in the description of the wire rope clamp assembly and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the wire rope clamp assembly. Notwithstanding that the numerical ranges and parameters setting forth the broad scope of the wire rope clamp assembly are approximations, the numerical values set forth in the specific examples are reported as precisely as possible. Any numerical values, however, inherently contain certain errors necessarily resulting from error found in their respective measurements.

In accordance with embodiments of the present invention, a wire rope clamp assembly is provided. Generally, the wire rope clamp assembly includes opposing clamping members that are connected together and configured to engage one or more elevator suspension members in a manner such that the elevator suspension members can be attended to for maintenance operations.

Figure 1:
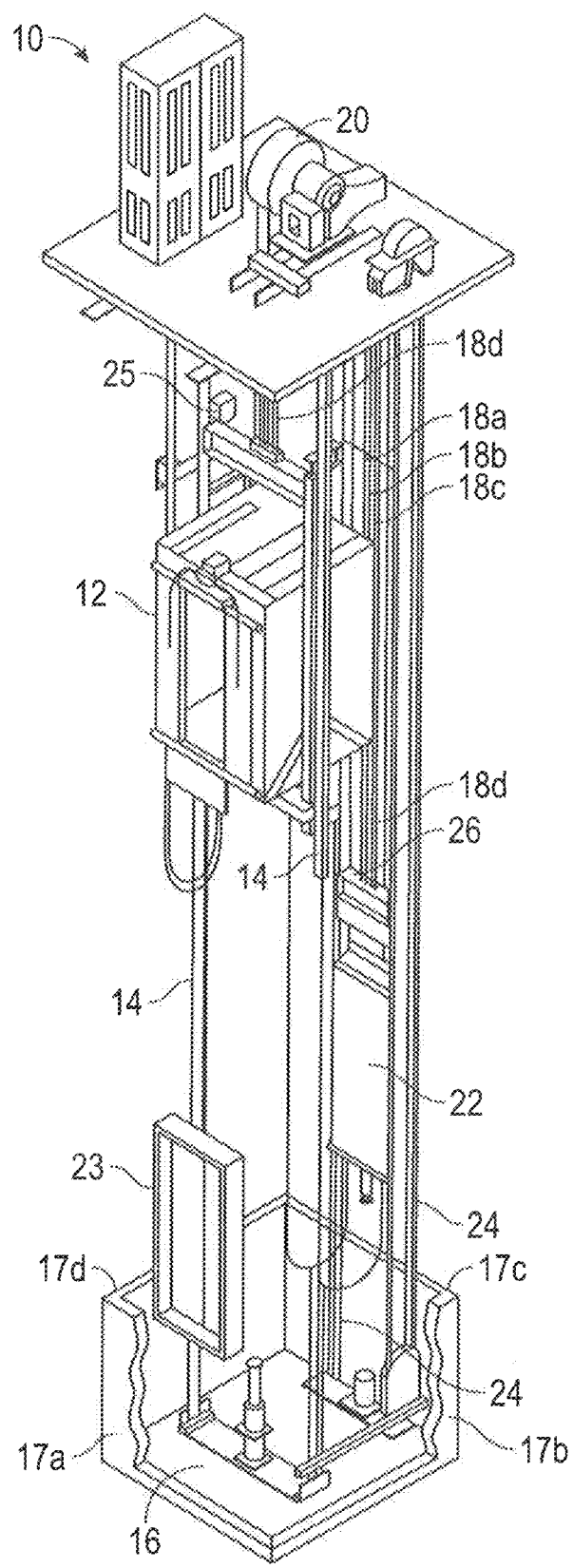
FIG. 1 is a perspective view of a conventional elevator.

Referring now to the drawings, there is illustrated in FIG. 1 a diagrammatic and simplified view of an elevator 10. The elevator 10 is conventional in the art and will only be briefly described herein. The elevator 10 includes an elevator car 12, configured for movement in a substantially vertical direction on opposing car guide rails 14. The opposing car guide rails 14 are disposed in the elevator hoistway 16. In the illustrated embodiment, the hoistway 16 is defined by cooperating hoistway walls 17a-17d. However, it should be appreciated that in other embodiments, the hoistway 16 can be defined by other structures, assemblies and components, such as the non-limiting example of structural divider beams and the like. The elevator car 12 is supported at one end by one or more suspension elements 18a-18d, which are moved with an elevator machine 20.

In the embodiment illustrated in FIG. 1, the suspension elements 18a-18d are wire ropes. The term "wire rope", as used herein, is defined to mean any assembly having a plurality of strands, with each of the strands formed from a plurality of individual wires. Typically, the strands have a parallel arrangement and are formed around a flexible core material, in order that the wire rope can be wound around rotating elements.

Referring again to FIG. 1, the other end of the one or more suspension elements 18a-18d is connected to a counterweight assembly 22. The counterweight assembly 22 is configured to balance a portion of the weight of the elevator car 12 and the rated capacity of the elevator car 12. The counterweight assembly 22 moves in a substantially vertical direction on opposing counterweight guide rails 24.

The elevator car 12 includes a plurality of car guide members 25 configured to roll on or slide against the car guide rails 14 as the elevator car 12 moves vertically within the hoistway 16. In a similar manner, the counterweight assembly 22 includes a plurality of counterweight guide members 26 configured to roll on or slide against the counterweight guide rails 24 as the counterweight assembly 22 moves vertically within the counterweight guide rails 24.

Referring again to FIG. 1, the hoistway 16 is divided vertically into building floors (not shown). Each of the building floors can have one or more entrances 23 configured to facilitate ingress into and egress out of the elevator car 12.

Referring now to FIGS. 2A and 2B, non-limiting examples of conventional suspension elements are illustrated. Referring first to FIG. 2A, a suspension element 18a includes a plurality of lays 30a, with each of the lays 30a being formed by a plurality of strands 32a. Each of the plurality of lays 30a is wrapped around a core material (not shown). The plurality of strands 32a forming each lay 30a are twisted in a common direction, opposite the twist direction of the lay 30a. The strands 30a forming the suspension element 18a have a "left-hand" lay, that is, the plurality of lays 30a rotate around the core material in a counterclockwise direction.

Referring now to FIG. 2B, a suspension element 18a' includes a plurality of lays 30a', with each of the lays 30a' being formed by a plurality of strands 32a'. Each of the plurality of lays 30a' is wrapped around a core material (not shown). The plurality of strands 32a' forming each lay 30a' are twisted in a common direction, opposite the twist direction of the lay 30a'. The strands 30a' forming the suspension element 18a' have a "right-hand" lay, that is, the plurality of lays 30a' rotate around the core material in a clockwise direction.

While the embodiments of the suspension elements 18a, 18a' illustrated in FIGS. 2A and 2B are described as having opposing twist directions of the lays and the strands, in other embodiments, the suspension elements can be configured with the lays and the strands twisted in a common direction. The suspension elements 18a, 18a' will be discussed in more detail below.

Referring again to FIGS. 2A and 2B, suspension element 18a has a circular cross-sectional shape and a diameter d1 and suspension element 18a' has a circular cross-sectional shape and a diameter d2. In the embodiments illustrated in FIGS. 2A and 2B, the diameters d1, d2 are in a range of from about 0.25 inches to about 1.00 inches. However, in other embodiments, the diameters d1, d2 can be less than about 0.25 inches or more than about 1.00 inches.

Referring again to FIG. 1, in certain instances it can be necessary to shorten or adjust the tension in the suspension elements 18a-18d. In certain instances, the tasks of shortening or adjusting the tension in the suspension elements 18a-18d can be completed by securing the elevator car 12 to the suspension elements 18a-18d in a manner such that frees the end of the suspension elements 18a-18d connected to the elevator car 12.

Figure 3:
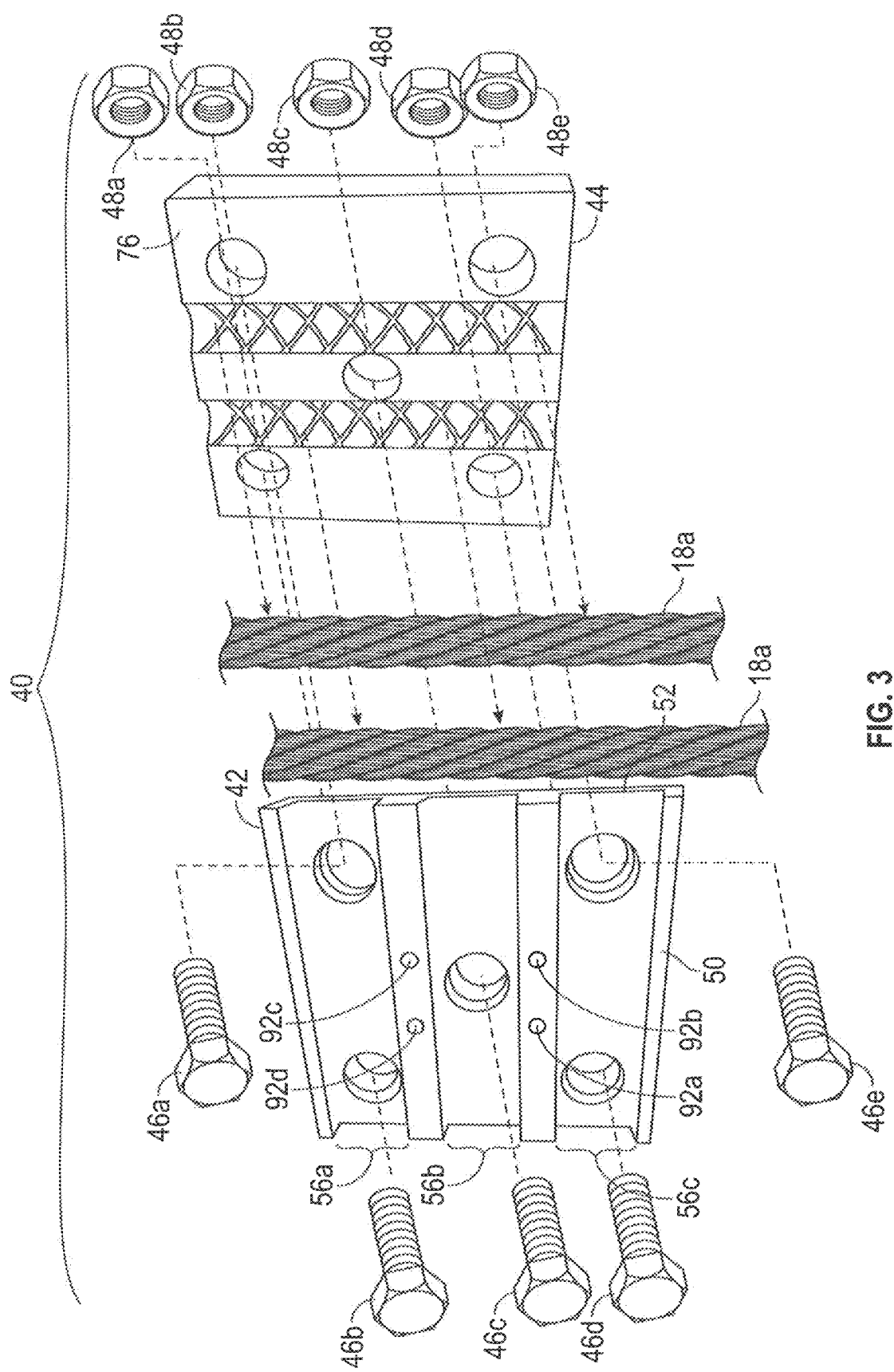
FIG. 3 is an exploded perspective view of a wire rope clamp assembly.
Figure 4:
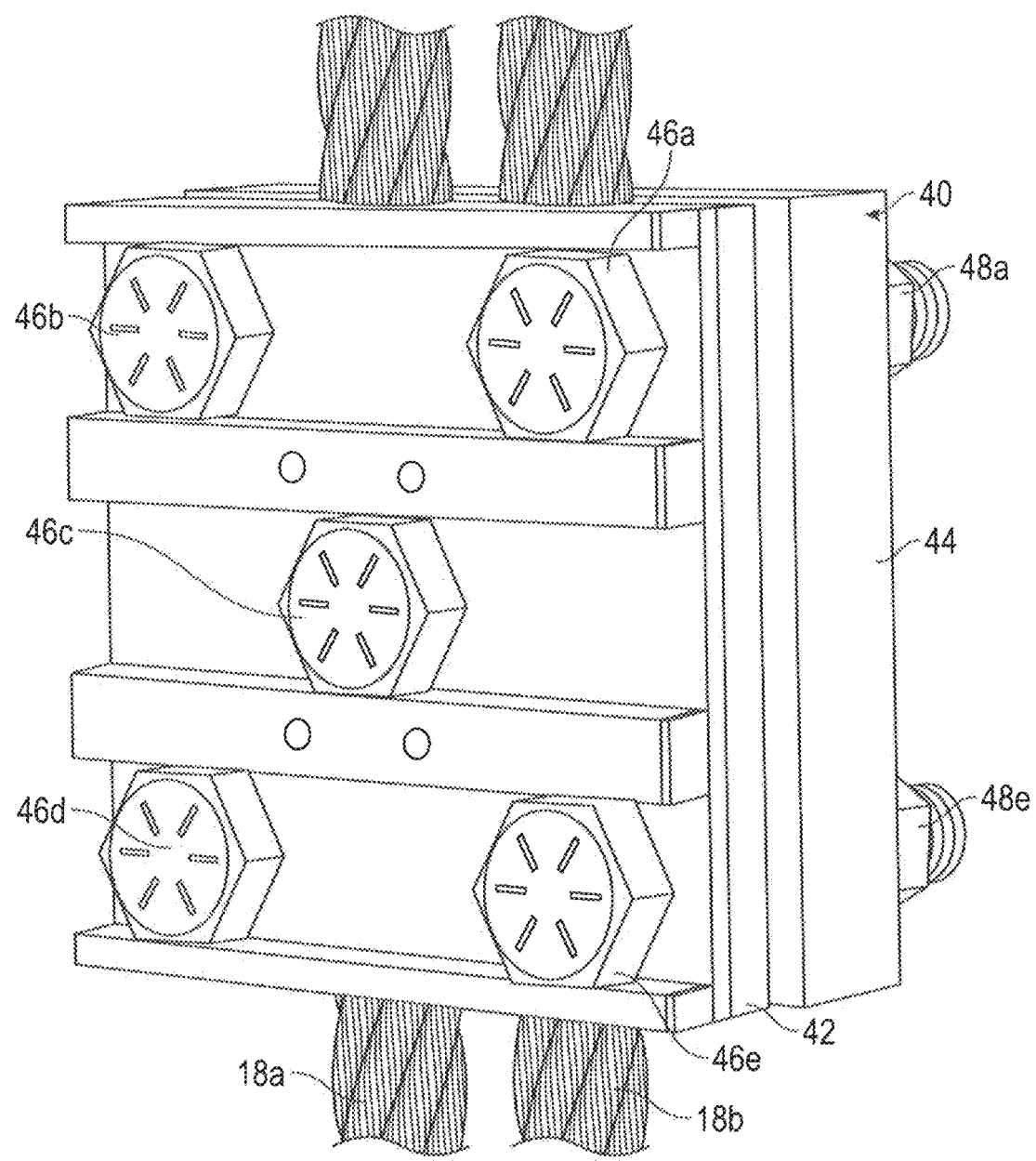
FIG. 4 is a perspective view of the wire rope clamp assembly of FIG. 3, shown in an installed arrangement.

Referring now to FIGS. 3 and 4, a wire rope clamp assembly 40 is illustrated. As will be described in more detail below, the wire rope clamp assembly (hereafter "clamp assembly") 40 is configured for attachment to a plurality of suspension members 18a-18d in a manner such that allows the clamp assembly 40 to support the elevator car 12 and free the ends of the suspension elements 18a, 18b connected to the elevator car 12. Referring first to FIG. 3, the clamp assembly 40 is shown in an exploded arrangement, with the clamp assembly 40 disengaged from a plurality of suspension members 18a, 18b. FIG. 4 shows the clamp assembly 40 in an engaged arrangement with the suspension members 18a, 18b. Advantageously, the clamp assembly 40 is further configured to attach to the suspension members 18a, 18b in a manner such that substantially resists slippage of the clamp assembly 40 in an axial direction along the suspension elements 18a, 18b.

Referring again to FIGS. 3 and 4, the clamp assembly 40 includes a first clamp member 42, a second clamp member 44, a plurality of threaded male fasteners 46a-46e and a plurality of threaded female fasteners 48a-48e.

Referring now to FIGS. 3 and 5A-5D, the first clamp member 42 is illustrated. The first clamp member 42 includes an outer face 50, an opposed inner face 52 and side faces 54a-54d. Referring first to the outer face 50, a plurality of channels 56a-56c extend from side face 54b to side face 54d. The channel 56a is axially aligned with axis A-A, channel 56b is axially aligned with axis B-B and channel 56c is axially aligned with axis C-C. In the illustrated embodiment, the axes A-A, B-B and C-C have a substantially parallel arrangement with each other. However, in other embodiments, the axes A-A, B-B and C-C can have other arrangements relative to each other.

Referring again to FIGS. 5A and 5B, the channel 56a has a rectangular cross-sectional shape that is formed by opposing channel side walls 58, 59 and channel bottom wall 60. In similar fashions, the channel 56b has a rectangular cross-sectional shape that is formed by opposing channel side walls 62, 63 and channel bottom wall 64 and the channel 56c has a rectangular cross-sectional shape that is formed by opposing channel side walls 66, 67 and channel bottom wall 68. The bottom walls 60, 64 and 68 of channels 56a-56c are substantially flat and are configured to seat adjoining portions of the threaded male fasteners 46a-46e, as will be discussed in more detail below.

Referring again to FIGS. 5A and 5B, each of the channels 56a-56c includes a plurality of apertures 70a-70e extending from the outer face 50 to the inner face 52. The apertures 70a-70e are configured to receive threaded portions of the threaded male fasteners 46a-46e in a manner such that the head portions of the threaded male fasteners 46a-46e seat against the channel bottom walls 60, 64 and 68. In the seated arrangement, the head portions of the threaded male fasteners 46a-46e are restrained from rotation by the side walls 58, 59, 62, 63, 66 and 67 of the channels 56a-56c.

Figure 5A:
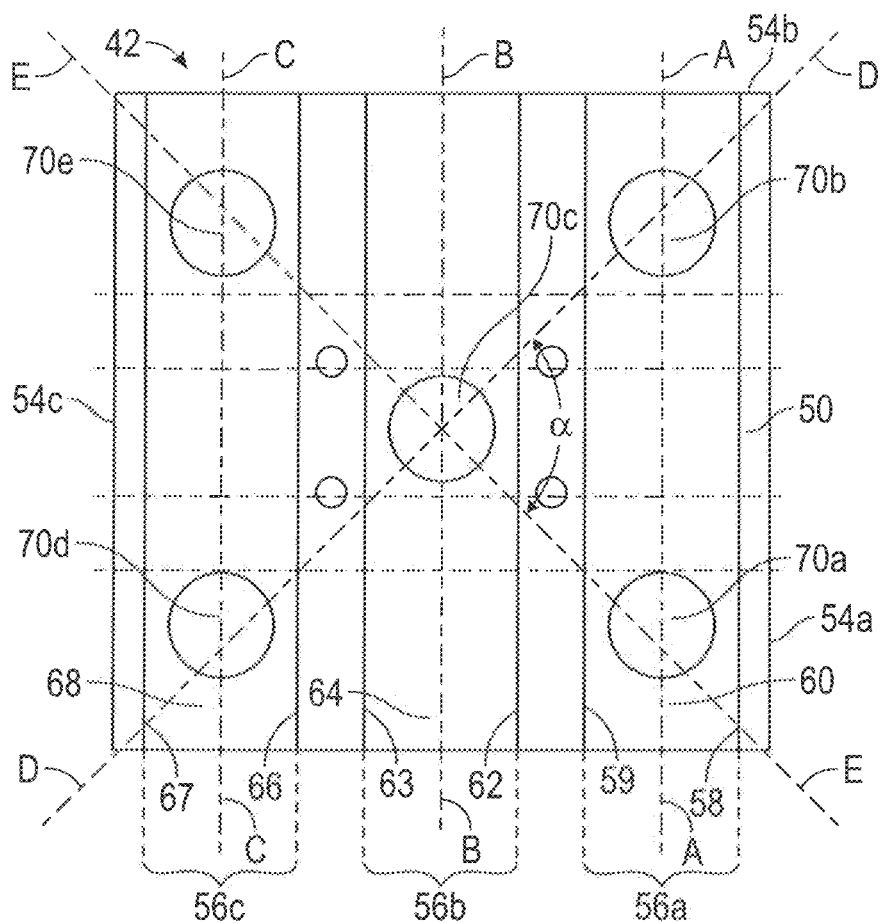
FIG. 5A is a front view of a first clamp member of the wire rope clamp assembly of FIG. 3.
Figure 5B:
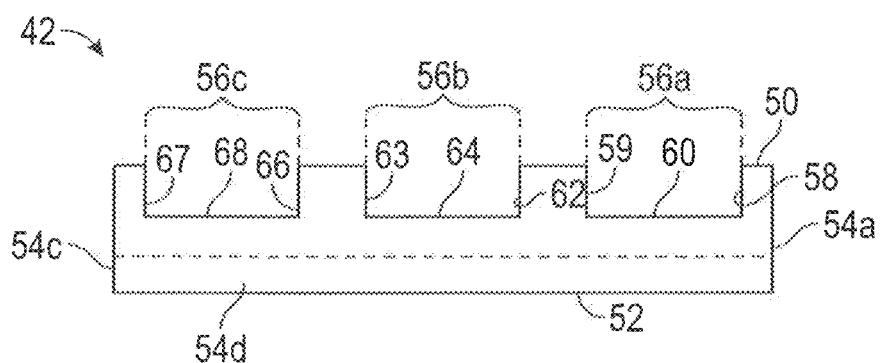
FIG. 5B is a side view of a first clamp member of the wire rope clamp assembly of FIG. 3.

Referring now to FIG. 5A, the channel 56a includes a quantity of the two apertures 70a, 70b, the channel 56b includes a lone aperture 70c and the channel 56c includes a quantity of two apertures 70d, 70e. The apertures 70a, 70c and 70e are arranged on axis D-D and the apertures 70b, 70c and 70e are arranged on axis E-E. The axes D-D and E-E form an angle α. In the illustrated embodiment, the angle α is in a range of from about 80° to about 100°.

Figure 5C:
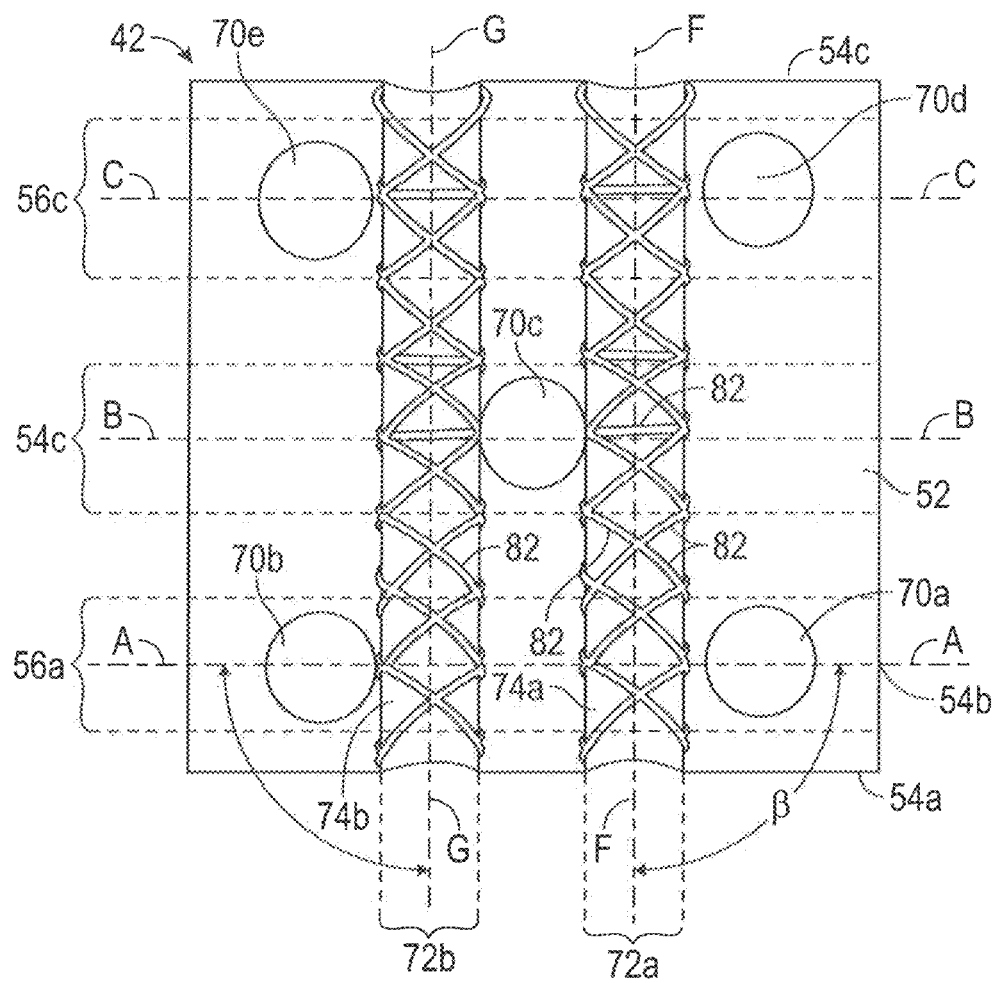
FIG. 5C is a back view of a first clamp member of the wire rope clamp assembly of FIG. 3.

Referring now to FIG. 5C, the apertures 70a and 70d are positioned on one side of a suspension element channel 72a and the aperture 70c is positioned on the other side of the suspension element channel 72a. In a similar manner, the apertures 70b and 70e are positioned on one side of a suspension element channel 72b and the aperture 70c is positioned on the other side of the suspension element channel 72b. Without being held to the theory, it is believed the relative arrangement of the threaded male fasteners 46a-46e within apertures 70a-70e and the positioning of the threaded male fasteners 46a-46e on both sides of the suspension elements channels 72a, 72b provides a clamping pressure of the first clamp member 42 and the second clamp member 44 against the suspension elements 18a, 18b sufficient to resist movement of the clamp assembly 40 in an axial direction along the suspension elements 18a, 18b. However, it should be appreciated that in other embodiments, other quantities of fasteners and apertures and other relative arrangements of the fasteners can be used, such that the clamping pressure of the first clamp member 42 and the second clamp member 44 against the suspension elements 18a, 18b is sufficient to resist movement of the clamp assembly 40 in an axial direction along the suspension elements 18a, 18b. In the illustrated embodiment, the threaded male fasteners 46a-46e are hex head ½×13 or ¾-12 bolts. However, in other embodiments, the threaded male fasteners 46a-46e can be other sizes or other structures sufficient to provide a clamping pressure between the first and second clamp members 42, 44.

Figure 5D:
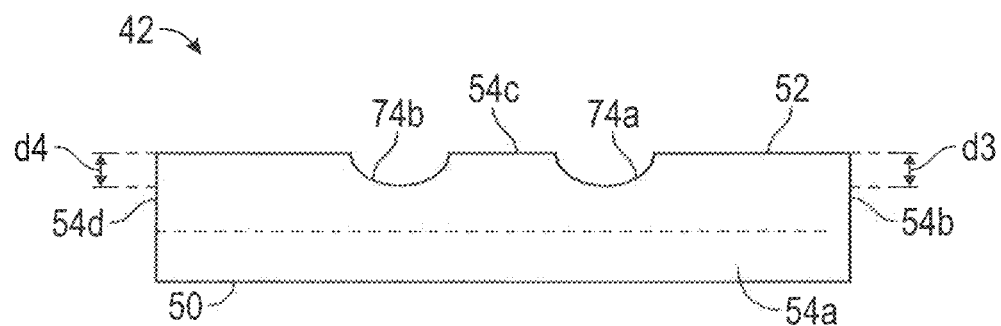
FIG. 5D is a side view of a first clamp member of the wire rope clamp assembly of FIG. 3.

Referring now to FIGS. 5C and 5D, the inner face 52 of the first clamp member 42 is illustrated. The suspension element channels 72a, 72b extend from side face 54a to side face 54c. Suspension element channel 72a is axially aligned with axis A-A and suspension element channel 72a is axially aligned with axis G-G. In the illustrated embodiment, the axes F-F and G-G have a substantially parallel arrangement with each other. However, in other embodiments, the axes F-F and G-G can have other arrangements relative to each other.

The axes F-F of suspension element 72a forms a transverse angle β with axis A-A of the channel 56a and E-E. In the illustrated embodiment, the transverse angle β is in a range of from about 80° to about 100°. Without being held to the theory, it is believed the relative transverse arrangement of the axes F-F of suspension element 72a and the axis A-A of the channel 56a provides a clamping pressure of the first clamp member 42 and the second clamp member 44 against the suspension elements 18a, 18b sufficient to resist movement of the clamp assembly 40 in an axial direction along the suspension elements 18a, 18b.

Referring again to FIGS. 5C and 5D, the suspension element channel 72a has an arcuate cross-sectional shape defined by wall 74a. In a similar manner, suspension element 72b has an arcuate cross-sectional shape defined by wall 74b.

Referring again to FIGS. 5C and 5D, the walls 74a, 74b are configured for several functions. First, the walls 74a, 74b are configured to receive portions of one or more suspension elements 18a-18d in a manner such that the one or more suspension elements 18a-18d are seated in an axially aligned arrangement with the suspension element channels 72a, 72b, as shown in FIGS. 3 and 4. Second, the walls 74a, 74b are configured to grip the one or more suspension elements 18a-18d in a manner such that substantially resists slippage of the clamp assembly 40 in an axial direction along the suspension elements 18a, 18b.

Figure 6:
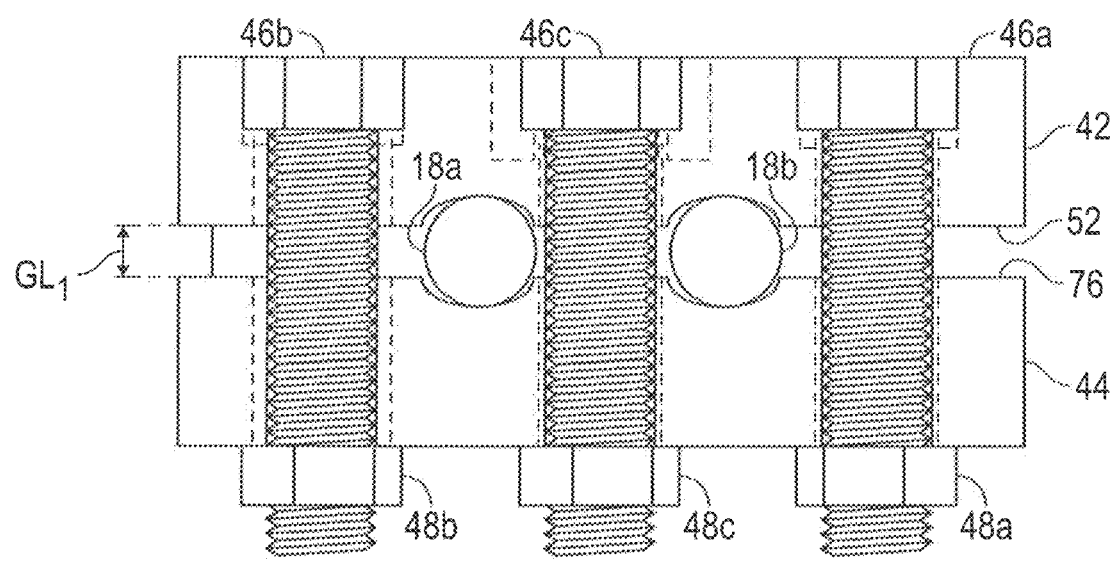
FIG. 6 is a plan view of the wire rope clamp assembly of FIG. 3, shown in an installed arrangement.

Referring again to FIGS. 5C and 5D, the wall 74a has a depth d3 and the wall 74b has a depth d4. The depths d3, d4 are less than half of the diameters d1, d2 of the suspension elements 18a, 18a' such that in an assembled arrangement, as shown in FIG. 6, the inner face 52 of the first clamp member 42 does not contact a corresponding inner face 76 of the second clamp member 44. A gap 78 is formed between the inner faces 52, 76 of the first and second clamp members 42, 44. The gap 78 has a gap length GL1. Without being held to the theory, it is believed the relative separation of the first and second clamp members 42, 44 results in a clamping pressure of the first clamp member 42 and the second clamp member 44 against the suspension elements 18a, 18b sufficient to resist movement of the clamp assembly 40 in an axial direction along the suspension elements 18a, 18b.

In the embodiments illustrated in FIGS. 2A and 2B, the diameters d1, d2 are in a range of from about 0.25 inches to about 1.00 inches and the gap length GL1 is in a range of from about 0.125 inches to about 0.25 inches. However, in other embodiments, the diameters d1, d2 can be less than about 0.25 inches or more than about 1.00 inches and the gap length GL1 can be less than about 0.125 inches or more than about 0.25 inches sufficient to provide a clamping pressure of the first clamp member 42 and the second clamp member 44 against the suspension elements 18a, 18b sufficient to resist movement of the clamp assembly 40 in an axial direction along the suspension elements 18a, 18b.

Referring now to FIG. 5C, the walls 74a, 74b of the suspension element channels 72a, 72b includes a plurality of surface structures 80. The term "surface structure", as used herein, is defined to mean any structure or treatment located within, on or extending from a surface. The plurality of surface structures 80 are configured for several functions. First, the surface structures 80 to grip portions of the plurality of lays 30a forming the suspension elements 18a as the suspension elements 18a are clamped between the first and second clamp members 42, 44. Second, the surface structures 80 are configured as "wear indicators". That is, as the clamp assembly 40 is used and the walls 74a, 74b become worn, the useful life of the clamp assembly 40 can be assessed by the remaining surface structures 80.

Referring again to FIG. 5C, the surface structures 80 extend continuously across the suspension element channels 72a, 72b from the side face 54a to the side face 54. In other embodiments, the surface structures 80 can be any desired pattern of discontinuous segments and the surface structures 80 can extend any desired distance of the suspension element channels 72a, 72b.

Figure 7A:
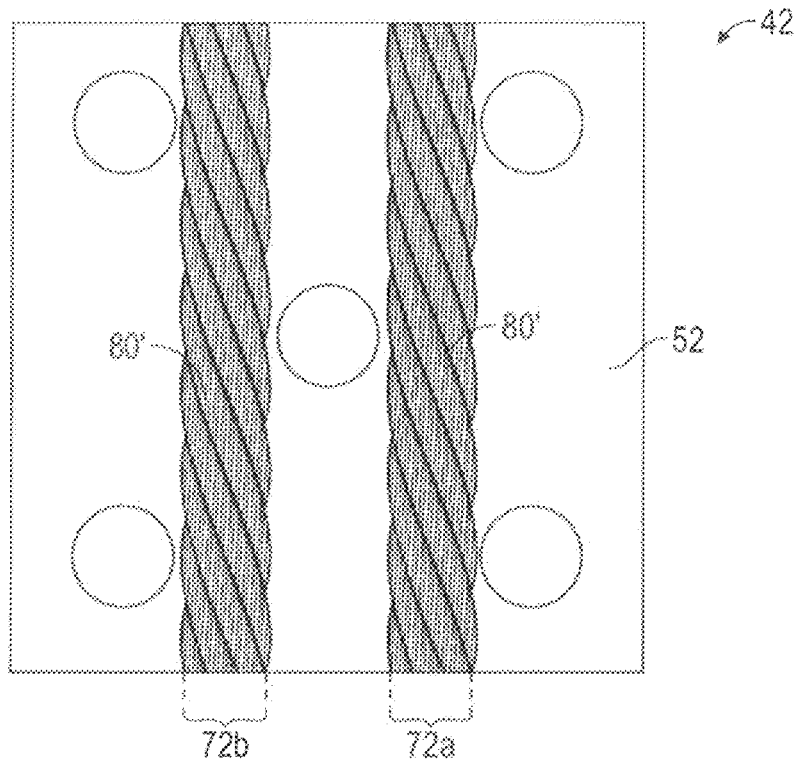
FIG. 7A is a front view of the first clamp member of FIG. 3 illustrating suspension element channels having a "left-hand" lay arrangement.
Figure 7B:
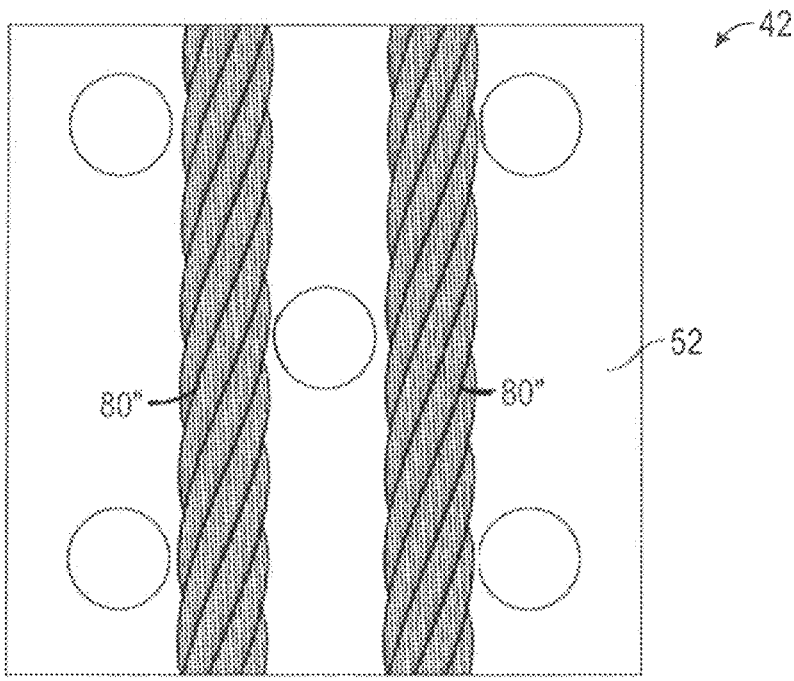
FIG. 7B is a front view of the first clamp member of FIG. 3 illustrating suspension element channels having a "right-hand" lay arrangement.

Referring again to the embodiment shown in FIG. 5C, the plurality of surface structures 80 have the form of multidirectional grooves 82. The term "multidirectional", as used herein, is defined to mean the grooves 82 are configured to engage the lays of a suspension member regardless of the orientation of the lays. Referring now to FIGS. 7A and 7B, it is contemplated that the surface structures 80 can be oriented in a substantially parallel arrangement to precisely align with the lays 30a forming the suspension elements 18a. Referring first to FIG. 7A, the surface structures 80' are oriented in a parallel arrangement that corresponds to the "left-hand" lays 30a shown in FIG. 2A. Referring now to FIG. 7B, the surface structures 80" are oriented in a parallel arrangement that corresponds to the "right-hand" lays 30a' shown in FIG. 2B. Without being held to the theory, it is believed orienting the surface structures in a direction that precisely aligns with the pattern and direction of twist of the lays forming the suspension elements results in a clamping pressure of the first clamp member 42 and the second clamp member 44 against the suspension elements 18a, 18b sufficient to resist movement of the clamp assembly 40 in an axial direction along the suspension elements 18a, 18b. In the embodiment shown in FIGS. 7A and 7B, the surface structures 80', 80" include grooves corresponding to the individual strands 32a, 32a' forming the lays 30a, 30a'. However, it should be appreciated that inclusion of grooves corresponding to the individual strands 32a, 32a' is optional, and the surface structures 80', 80" are functional with grooves oriented in a substantially parallel arrangement to precisely align with the lays 30a forming the suspension elements 18a.

While the surface structures shown in FIGS. 5C, 7A and 7C have the form of grooves, it is contemplated that in other embodiments the plurality of surface structures 80 can have other forms. As one non-limiting example, the surface structures can have the form of a knurled surface. The term "knurled surface", as used herein, is defined to mean a series of intersecting cross-hatchings forming raised ridges or projections. The cross-hatching can be configured to extend from the walls 74a, 74b of the suspension element channels 72a, 72b a height such that the surface structures 80 can engage and grip the lays 30a of the suspension element 18a.

As another non-limiting example of alternate surface structures, it is contemplated that discontinuous segments of surface structures 80 can be arranged in rows and columns on the walls 74a, 74b. The discontinuous segments of surface structures 80 can be arranged in any desired pattern and can have any desired surface structure.

As yet another non-limiting alternate example, the surface structures can have the form of a plurality of nibs. The term "nib", as used herein, is defined to mean any structure having a substantially protruding extremity. The "nibs" can have a circular cross-sectional shape and can be arranged in random patterns or in rows and columns. However, the "nibs" can have any desired cross-sectional shape and can be arranged in desired pattern. It is further contemplated that the surface structures can have a different from each other.

As yet additional non-limiting alternate examples, the surface structures can have the shape of alphabetical letters, numbers or other desired shapes. Optionally, the letters forming the surface structures 80 can form words, phrases, numbers or logos.

While the surface structures 80 are described above as structures formed integral to the walls 74a, 74b of the suspension element channels 72a, 72b, it is within the contemplation of the wire rope clamp assembly that one or more surface structures can be applied to or attached to the walls 74a, 74b. As one non-limiting example of an applied surface structure, the walls 74a, 74b can include one or more applied surface coating structures. In this embodiment, the applied surface structures can be a coating or layer of a substantially abrasive material, such as for example, an abrasive grit that extends from the walls 74a, 74b. Non-limiting examples of abrasive grit include silica, iron oxide, aluminum oxide or polymeric materials. The abrasive grit can be attached to the walls 74a, 74b in any desired manner, including, for example, adhesives or sonic welding.

Figure 8A:
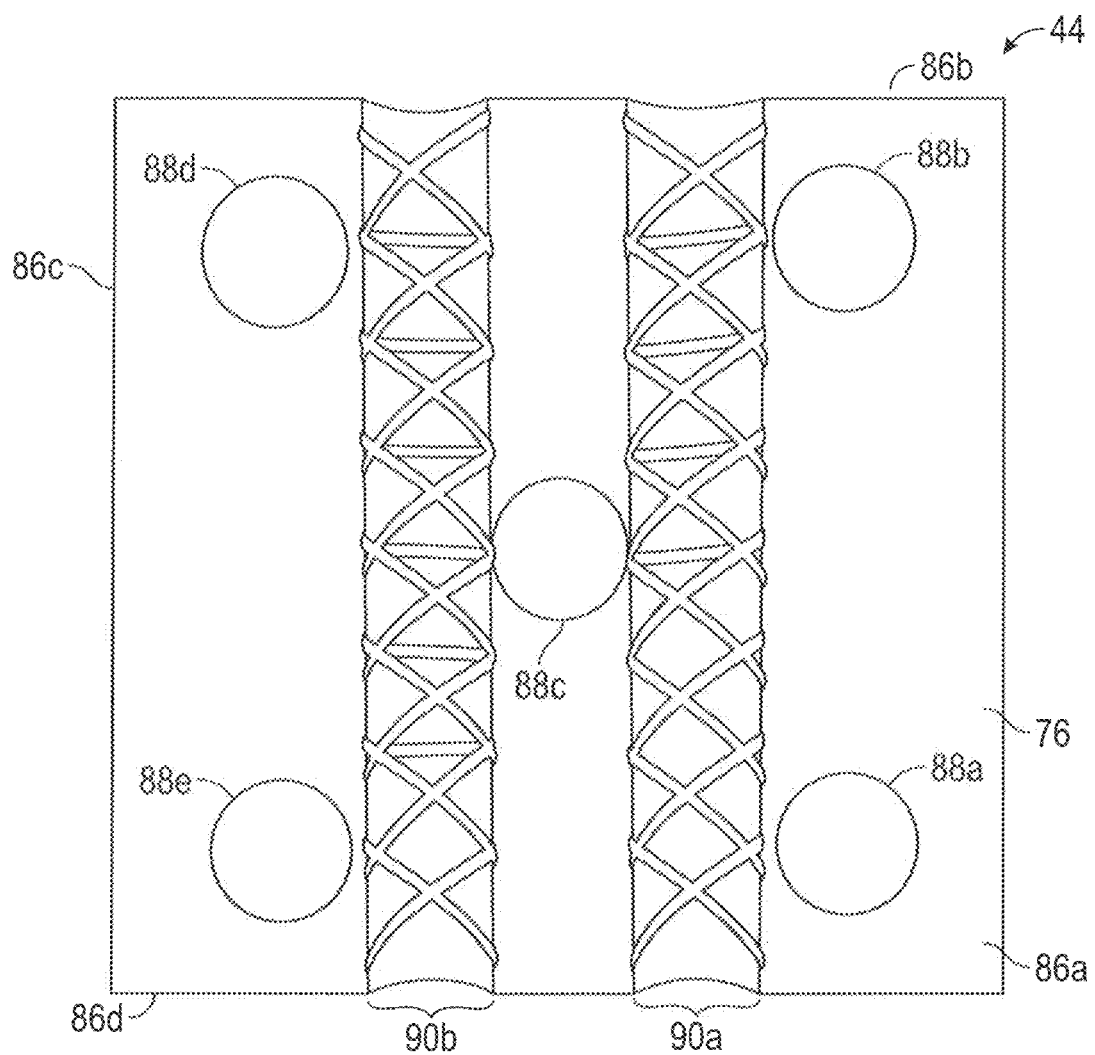
FIG. 8A is a front view of a second clamp member of the wire rope clamp assembly of FIG. 3.
Figure 8B:
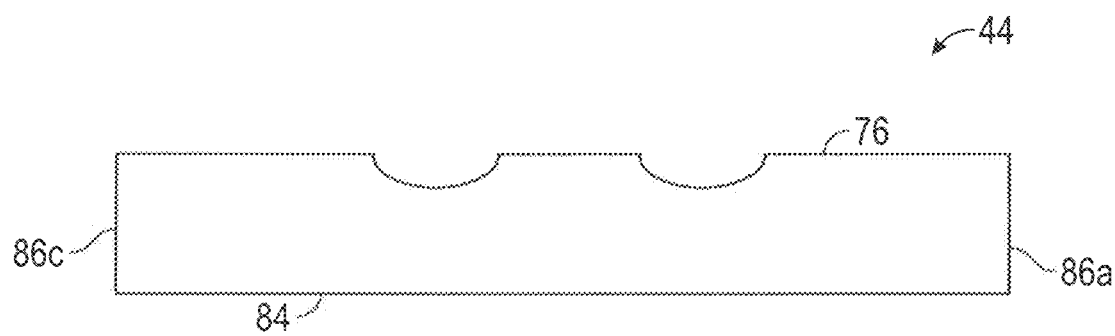
FIG. 8B is a side view of a second clamp member of the wire rope clamp assembly of FIG. 3.

Referring now to FIGS. 8A and 8B, the second clamp member 44 is illustrated. The second clamp member 44 includes an outer face 84, the opposed inner face 76, side faces 86a-86d, a plurality of apertures 88a-88e and a plurality of suspension element channels 90a, 90b.

The apertures 70a-70e extend from the inner face 76 to the outer face 84 and are configured to receive threaded portions of the threaded male fasteners 46a-46e in a manner such that the threaded female fasteners 48a-48e can be threaded on the threaded male fasteners 46a-46e. In an installed arrangement, the threaded female fasteners 48a-48e are seated against the outer face 84 of the second clamp member 44 as shown in FIG. 4.

Referring now to FIGS. 5A and 8A, the apertures 88a-88e are arranged to align with the apertures 70a-70e in the first clamp member 42. Accordingly, the relative positioning of the aligned apertures 70a-70e and 88a-88e advantageously allows the positioning of threaded male fasteners 46a-46e both sides of the suspension elements channels 72a, 72b as described above.

Referring again to the embodiment shown in FIGS. 8A and 8B, the suspension element channels 90a, 90b are the same as, or similar to, the suspension element channels 72a, 72b shown in FIGS. 5C and 5D. However, in other embodiments, the suspension element channels 90a, 90b can be different from the suspension element channels 72a, 72b.

Referring now to FIG. 3, the first and second clamp members 42, 44 are formed from a lightweight metallic material, such as for example aluminum. The lightweight metallic material advantageously provides a simple, lightweight assembly that can be handled in often-cramped spaces of an elevator hoistway.

Referring now to FIG. 3, installation of the clamp assembly 40 will now be described. In a first installation step, the suspension member channels 72a, 72b of the first clamp member 42 are axially aligned with the suspension members 18a, 18b. In a next step, the first clamp member 42 is placed in contact with the suspension members 18a, 18b in a manner such that the suspension members 18a, 18b seat in the suspension member channels 72a, 72b in an axially aligned arrangement. In a next step, the second clamp member 44 is brought into contact with the suspension members 18a, 18b with the suspension member channels 90a, 90b axially aligned with the suspension members 18a, 18b. In a next step, the threaded male fasteners 46a-46e are inserted through the aligned apertures 70a-70e and 88a-88e of the first and second clamp members 42, 44. The threaded male fasteners 46a-46e are inserted until the head portions of the threaded male fasteners 46a-46e seat against the channel bottom walls 60, 64 and 68 of the first clamp member 42. In a final installation step, the threaded female fasteners 48a-48e are threaded onto the threaded male fasteners 46a-46e until seated against the outer face 84 of the second clamp member 44. Advantageously, in an assembled arrangement, the clamp assembly 40 is rated for a hoisting capacity of 2000 pounds per rope, which is considerable more capacity than conventional clamp assemblies.

Referring again to FIG. 3, optionally the first clamp member 42 can include a plurality of apertures 92a-92d. The apertures 92a-92d are configured to receive portions of a tool (not shown for purposes of clarity) configured to limit rotation of the first and second clamp members 42, 44 as the first and second clamp members 42, 44 are assembled. Any desired quantity of optional apertures can be used and the apertures can have any desired shape, form or structure, sufficient to engage a tool and limit the rotation of the first and second clamp members 42, 44 as the first and second clamp members 42, 44 are assembled.

Referring now to the embodiment shown in FIG. 3, while the first and second clamp members 42, 44 are shown to receive a quantity of two suspension elements, it should be appreciated that in other embodiments, the first and second clamp members 42, 44 can be configured to receive one suspension element or more than two suspension elements.

The principle and mode of operation of the wire rope clamp assembly have been described in the illustrated embodiments. However, it should be noted that the wire rope clamp assembly may be practiced otherwise than as specifically illustrated and described without departing from its scope.

What is claimed is:

1. A wire rope clamp assembly for use with an elevator, the wire rope clamp assembly comprising:
    a first clamp member having an outer side and an inner side, the inner side having a plurality of channels configured to receive one or more suspension members, the plurality of first clamp member channels having a plurality of surface structures configured to engage lays of the one or more suspension members;
    a second clamp member configured for attachment to the first clamp member, the second clamp member having an outer side and an inner side, the inner side having a plurality of channels configured to receive the one or more suspension members, the plurality of second clamp member channels having a plurality of surface structures configured to engage lays of the one or more suspension members;
    wherein the plurality of surface structures for the first and second clamp member channels are multidirectional.

2. The wire rope clamp assembly of claim 1, wherein the multidirectional surface structures for the first and second clamp member channels are grooves.

3. The wire rope clamp assembly of claim 1, wherein the outer side of the first clamp member includes a plurality of outer side channels.

4. The wire rope clamp assembly of claim 3, wherein each of the outer side channels includes a plurality of apertures, each configured to receive a threaded fastener therethrough.

5. The wire rope clamp assembly of claim 4, wherein the outer side channels are configured to prevent rotation of the threaded fasteners.

6. The wire rope clamp assembly of claim 4, wherein the second clamp member includes a plurality of apertures and wherein the second clamp member apertures align with the first clamp member apertures.

7. The wire rope clamp assembly of claim 1, wherein the first clamp member includes a plurality of apertures configured to engage a tool for preventing the rotation of the wire rope clamp assembly.

8. A wire rope clamp assembly for use with an elevator, the wire rope clamp assembly comprising:
    a first clamp member having a plurality of channels configured to receive one or more suspension members, the plurality of first clamp member channels having a plurality of surface structures configured to engage lays of the one or more suspension members;
    a second clamp member configured for attachment to the first clamp member with a plurality of fastening elements, the second clamp member having a plurality of channels configured to receive the one or more suspension members, the plurality of second clamp member channels having a plurality of surface structures configured to engage lays of the one or more suspension members;
    wherein the plurality of fastening elements are positioned on both sides of each of the one or more suspension members.

9. The wire rope clamp assembly of claim 8, wherein the surface structures for the first and second clamp member channels are grooves.

10. The wire rope clamp assembly of claim 9, wherein the grooves are multidirectional.

11. The wire rope clamp assembly of claim 8, wherein the first clamp member includes an outer side and an inner side, and wherein the outer side includes a plurality of channels.

12. The wire rope clamp assembly of claim 8, wherein the first clamp member includes a plurality of apertures configured to engage a tool for preventing the rotation of the wire rope clamp assembly.

\* \* \* \* \*